United States Patent
Ichiba et al.

[11] Patent Number: 5,259,122
[45] Date of Patent: Nov. 9, 1993

[54] TOUCH SIGNAL PROBE

[75] Inventors: Yasuhiro Ichiba; Hideo Morita, both of Kawasaki, Japan

[73] Assignee: Mitutoyo Corporation, Tokyo, Japan

[21] Appl. No.: 946,382

[22] Filed: Sep. 17, 1992

[30] Foreign Application Priority Data

Sep. 25, 1991 [JP] Japan .................. 3-274779

[51] Int. Cl.⁵ .............................. G01B 5/03
[52] U.S. Cl. ............................. 33/561; 33/559
[58] Field of Search ............ 33/558, 561, 556, 559

[56] References Cited

U.S. PATENT DOCUMENTS

| 4,084,323 | 4/1978 | McMurtry | 33/561 |
| 4,158,919 | 6/1979 | McMurtry | 33/556 |
| 4,866,854 | 9/1989 | Seltzer | 33/561 X |
| 5,029,399 | 7/1991 | McMurtry | 33/556 X |
| 5,111,592 | 5/1992 | Aehnelt et al. | 33/561 |

FOREIGN PATENT DOCUMENTS

| 0303831 | 2/1989 | European Pat. Off. | 33/559 |
| 3-13813 | 1/1991 | Japan . | |
| 0983441 | 12/1982 | U.S.S.R. | 33/558 |

Primary Examiner—William A. Cuchlinski, Jr.
Assistant Examiner—Alvin Wirthlin
Attorney, Agent, or Firm—Flynn, Thiel, Boutell & Tanis

[57] ABSTRACT

A touch signal probe wherein a stylus installation shaft 2 and a stylus are connected by two springs 8 and 10 so as to move in a X-Y direction and a Z direction and a slat of a damper 9 is contained in a closed closure space S between the spring 8 and the spring 10, which space S is filled with a viscous liquid.

6 Claims, 4 Drawing Sheets

TOUCH SIGNAL PROBE

BACKGROUND OF THE INVENTION

1. Field of the Invention

The present invention is usable in coordinate measuring machines, such as a three-dimensional measuring machine with regard to a touch signal probe which outputs touch signals by contact with an object to be measured.

2. Description of the Related Art

The touch signal probe is attached to the probe installation shaft which moves the probe into contact with an object to be measured placed on a mounting table of the measuring machine. When the stylus of the touch signal probe touches the object to be measured, since the position of the stylus installation shaft is determined by sensors, the sensors output touch signals. Accordingly, the size and shape of the object to be measured can be measured based on the touch signals outputted from the sensors. The stylus installation shaft is supported to be displaced by the blade-like springs. To prevent the vibrations of the stylus generated during a movement of the probe to the objects to be measured and after a contact with the object to be measured, the stylus installation shaft is equipped with a damper mechanism filled with viscous liquid around a damper slat.

Conventional touch signal probes include one type in which one blade-like spring is used and the other type in which two blade-like springs are spaced away from each other along a longitudinal axis of the stylus installation shaft and when the stylus touches the object to be measured, according to the direction from whence they are touched, the stylus installation shaft is displayed at right angles to the longitudinal axis direction of stylus installation shaft (the X-Y direction) through the blade-like spring part, or in axial direction (the Z direction) of the stylus installation shaft.

In the touch signal probe where one blade-like spring is used, because the spring of the blade-like spring is greatly different between the X-Y direction and the Z direction, with regard to the measuring force of the blade-like spring at the time when the stylus touches the object to be measured, the measuring force in the X-Y direction is dozens of times as big as that in the Z direction. so that the problem of generating polarity of the measuring force was brought about as a result. While in the touch signal probe where two blade-like springs are used, because it is possible to make the difference between the spring constant in the X-Y direction and in the Z direction small, the difference of the measuring force between each direction can be made smaller than that of the touch signal probe having one blade-like spring but it doesn't become small enough and the problem of polarity in the measuring force has remained.

Moreover, in the touch signal probe where two blade-like springs are installed, these two blade-like springs are arranged widely apart from each other along the longitudinal axis of the stylus installation shaft and the above-mentioned sensors are provided between the two blade-like springs. Therefore, since the distance between the displacement center of the stylus installation shaft and the sensors is short, when the stylus touches the object to be measured from the X-Y direction even if the displacement quantity of the stylus is enough, the displacement quantity of the stylus installation shaft at the part where the sensor is provided is small, whereby this type evolves a problem of lowering the detection sensitivity of the sensor in the X-Y direction.

An object of the present invention is to provide a touch signal probe without the polarity of measuring force in the way of equalizing the measuring force in the X-Y direction and the Z direction.

Another object of the present invention is to provide a touch signal probe with high detection sensibility in the X-Y direction by sensors.

SUMMARY OF THE INVENTION

The touch signal probe according to the present invention includes a stylus adapted to contact an object to be measured; a stylus installation shaft having the stylus mounted thereon; sensors positions to oppose the stylus installation shaft to detect the displacement thereof caused by a contact of the stylus with the object to be measured; two blade-like springs capable of orthogonal movement of the stylus installation shaft therewith, and defining a closed closure space therebetween in the axial direction of the stylus installation shaft; and a slat of a damper housed in the closed closure spaced which is filled with a viscous liquid and oriented at right angles to the stylus installment shaft and having a thick hub part at the center thereof, and through which the stylus installation shaft extends in a condition of contact with the two blade-like springs.

DETAILED DESCRIPTION OF THE PREFERRED EMBODIMENT(S)

A preferred embodiment of the present invention will be explained below and in reference to the attached drawings.

Figure 1:
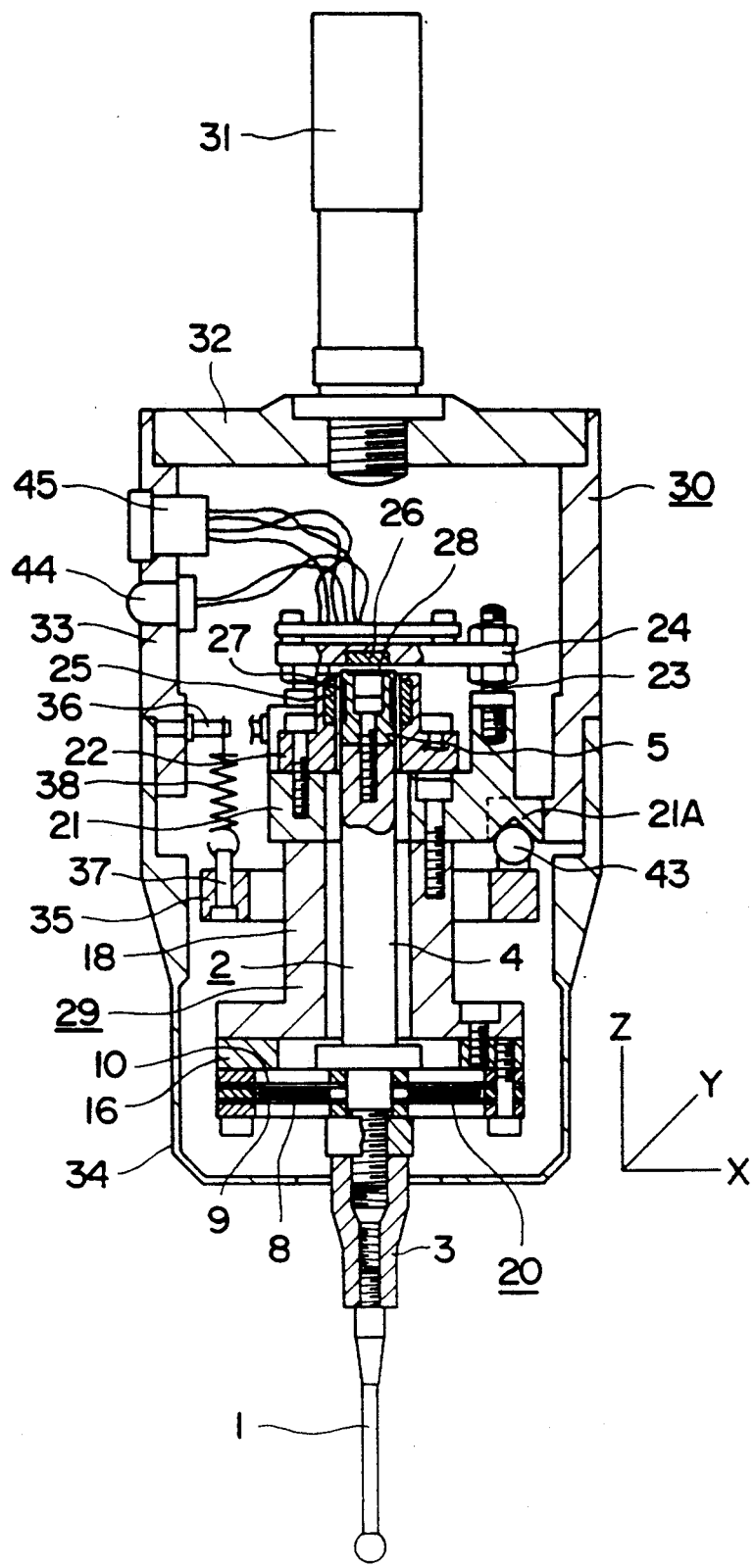
FIG. 1 is a sectional view to show the inner structure of a touch signal probe with regard to the preferable embodiment based on the present invention.
Figure 3:
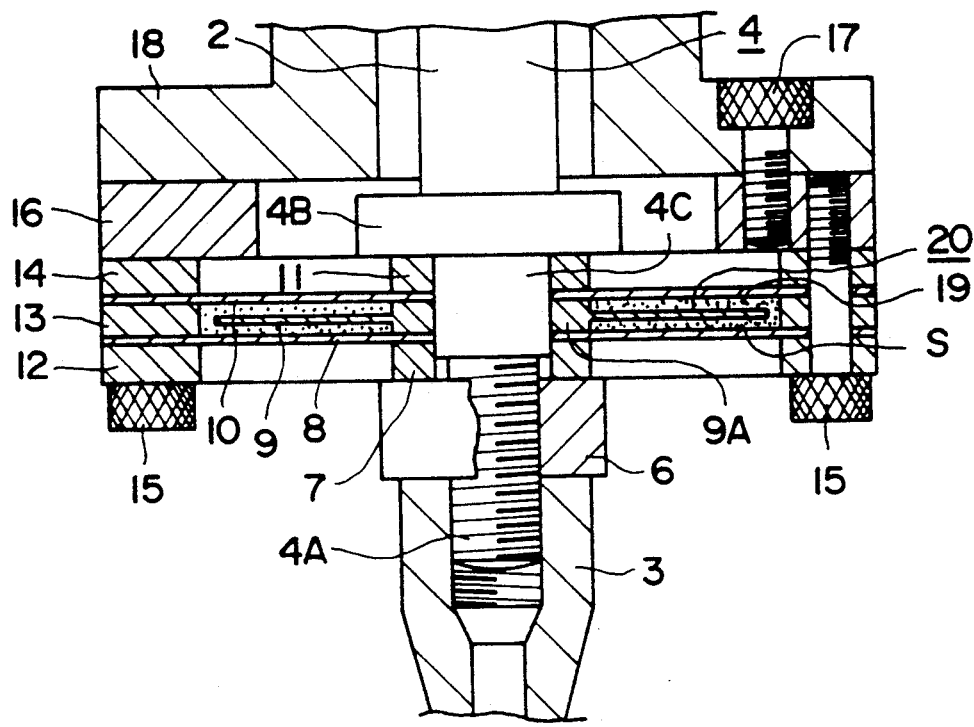
FIG. 3 is an enlarged sectional view to show two blade-like springs operatively connected to the stylus installation shaft oriented at a center of displacement thereof.

FIG. 1 is a sectional view which shows the whole touch signal probe, according to this embodiment, which is installed to a probe installation shaft as the Z shaft structure of a three-dimensional measuring machine. A stylus 1 is attached to the bottom end of the stylus installation shaft 2 where the adapter 3, the central shaft 4 and the ferrite plate installment block 5 are connected in series. As is shown in FIG. 3, the nut 6 and the adapter 3 are screwed onto the screw 4A formed at the bottom end of the central shaft 4 in order. Between the nut 6 and the flange part 4B on the central shaft 4, a small diameter shaft part 4C is formed which extends through each central hole of a first small-diameter ring 7, a first blade-like spring 8, a slat of a damper 9, a second blade-like spring 10, and a second small-diameter ring 11. In addition, these members 7-11 are tightened together by the nut 6 and the flange part 4B.

The annular slat of a damper, particularly at the central portion thereof has a thick central hub part 9A, the lower surface thereof touching the first blade-like spring 8 and the upper surface thereof touching the second blade-like spring 10. Under this touching condition, the first and the second blade-like springs 8, 10 and the annular slat 9 are connected so that the planes thereof are at right angles to the axis of the stylus installation shaft 2.

The first and second blade-like springs 8, 10 are extended longer in a direction of the diameter of the stylus installation shaft 2 than in that of the annular slat 9. First, second and third large-diameter rings 12-14 are arranged adjacent the peripheral part of these springs 8 and 10. The peripheral part of the first blade-like springs is positioned between the first large-diameter ring 12 and the second large-diameter ring 13 and, also the peripheral part of the second blade-like spring 10 is positioned between the second large-diameter ring 13 and the third large-diameter ring 14. These members are connected all together, by the bolt 15, to a spacer 16 which is connected to the housing 18 by the bolt 17. Therefore, the first and the second blade-like springs 8, 10 are connected to the housing 18 through the spacer 16 and the stylus installation shaft 2 can be considered to be supported by the first and the second blade-like springs 8, 10. For this reason, the stylus installation shaft 2 supported by the first and the second blade-like springs 8, 10 can be displaced in the X-Y direction and Z direction (See FIG. 1) on account of the elastic action of both blade-like springs 8 and 10.

As can be seen in FIG. 3, a spacer S between the first blade-like spring 8 and the second blade-like spring 10 and which is occupied by the slat of the damper 9, is bordered by the first and the second blade-like springs 8, 10, the second large-diameter ring 13 and the thick hub part 9A at the center of the slat 9 and is filled with a viscous liquid 19 for damping. Incidentally, the damper mechanism 20 for eliminating unwanted vibration in the X-Y direction and the Z direction caused by the movement of stylus 1 and the stylus installation shaft 2 is made up of the annular slat of the damper 9 and the viscous liquid 19.

As is shown in FIG. 1, a X-Y sensor installation block 22 is set on the upper part of the above-mentioned housing 18 through a middle block 21. A Z sensor installation board 24 is also provided on the middle block 21 through strut bolts 23. Each installation block 22 is installed with the X-Y sensor 25 arranged on the four horizontal directions of the X and Y directions, the Z sensor installation board 24 is installed with the Z sensor 26. These sensors 25, 26, which are inductance sensors, are positioned to face the ferrite plate installment block 5 located on the upper side of the stylus installation shaft 2. But, the ferrite installation block 5 has to be properly provided with ferrite plates 27 and 28 facing the sensors 25 and 26. Therefore, the stylus installation shaft 2, on the basis of the first and the second blade-like springs 8 and 10, detects the displacement in the X-Y direction by the X-Y sensors 25 and also, in the Z direction by the Z sensor 26.

Figure 2:
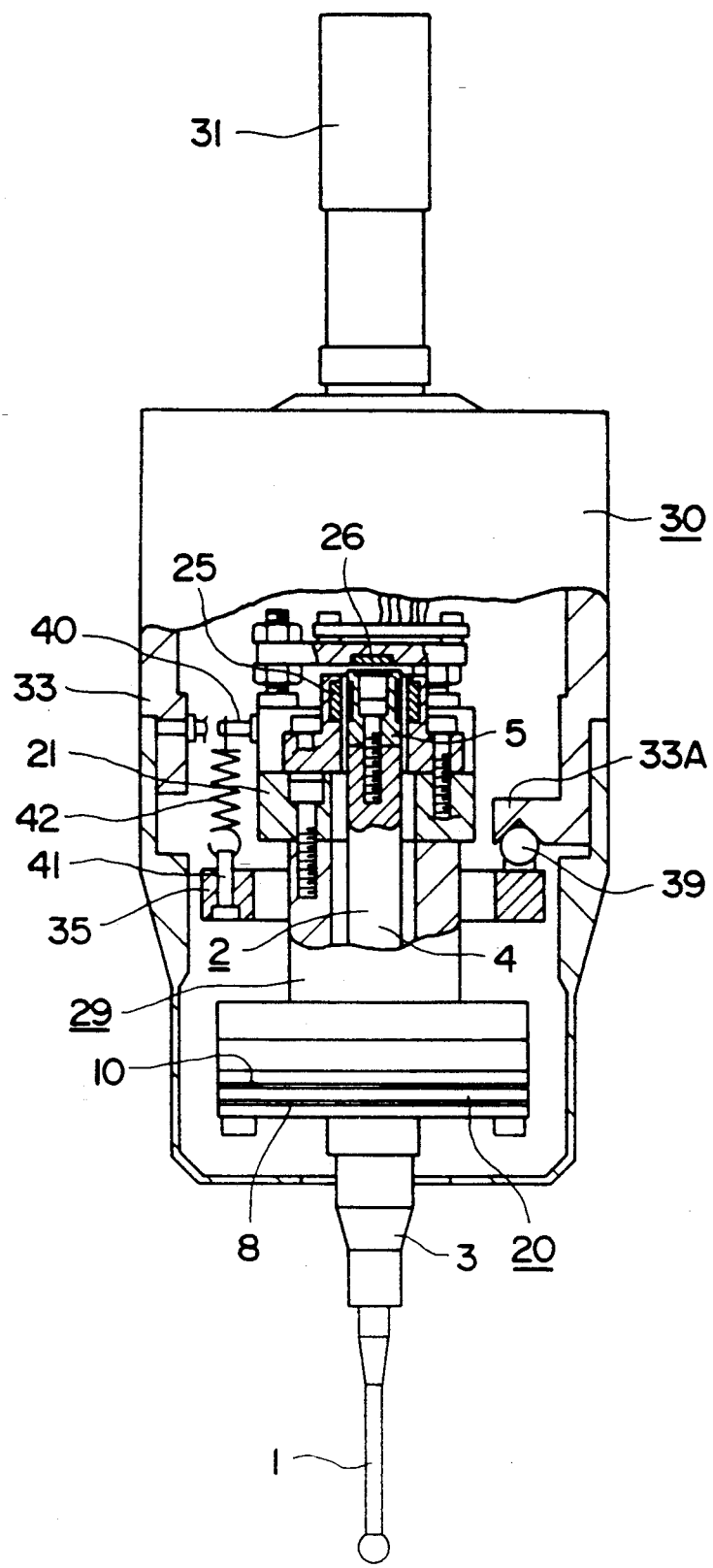
FIG. 2 is a sectional view on a different plane through the touch signal probe to show the main parts differently from that of FIG. 1.
Figure 4:
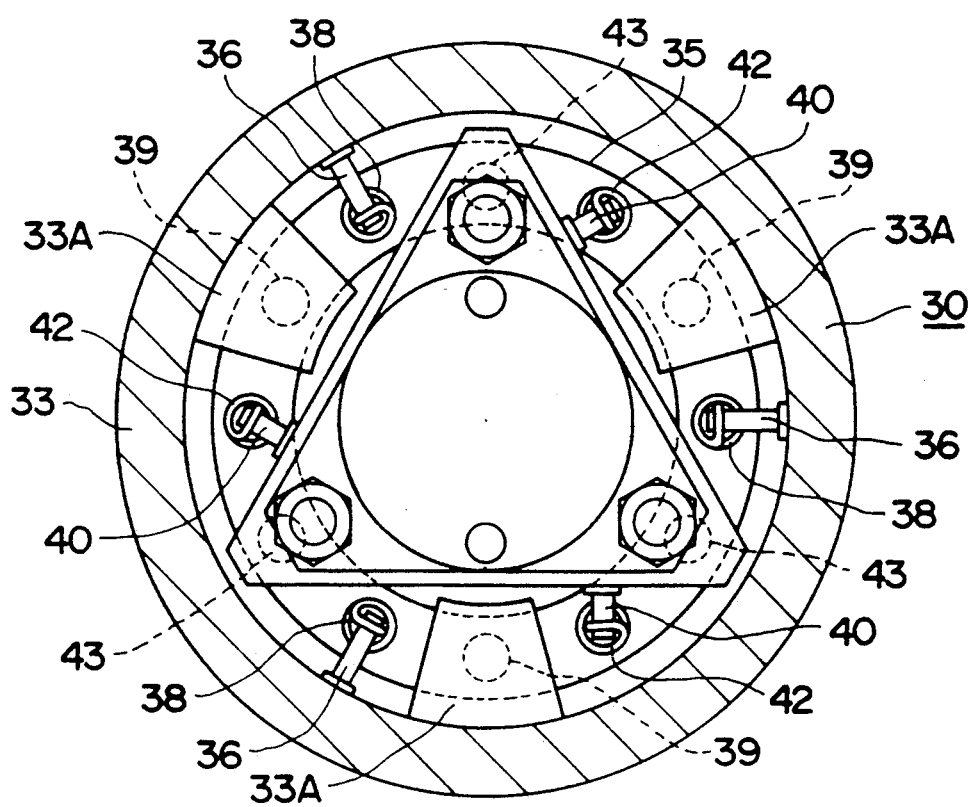
FIG. 4 is a sectional view taken along the line 4—4 of the touch signal probe shown in FIG. 1.

A stylus support 29 for supporting the stylus and the stylus installation shaft 2 by the first and the second blade-like springs 8 and 10 is defined by the spacer 16, which surrounds the stylus installation shaft 2, the housing 18 and the middle block 21 and etc. A casing 30 which contains the stylus support 29 thereinside is made up from the upper cover 32 which has a shank 31 thereon, a housing 33 and a lower cover 34. A ring-shaped member 35 is provided in the inner periphery of the stylus support 29 and a first tension spring extends hangs between a pin 36 at the inside of the housing 33 and corresponding pin 37 of the ring-shaped member 35. As is shown in FIG. 4, three of the first tension springs 38 are arranged on the circumference of the ring-shaped member 35 at equal intervals and the ring-shaped member 35 is always pulled up by the drawing power of the first tension springs 38. And as is shown in FIG. 2, the housing 33 has an inwardly projecting part 33A and, as is shown in FIG. 4, three of the first balls 39 lie on the circumference of the ring-shaped member 35 as in the case of the above-explained first tension spring 38, and at the same intervals and in the V groove formed in the bottom of the projected part 33A and on the circumference of the ring-shaped member 35. Therefore, the power of the first tension springs 38 which pulls up the ring-shaped member 35 is abutted by these first balls 39. Accordingly, in the inside of the casing 30, the three point linkage which support the ring-shaped member 35 at three points is composed of the above-mentioned first springs 38 and the first balls 39.

As is shown in FIG. 2, to pull the stylus support 29 to the ring-shaped member 35, the middle block 21 and the ring-shaped member 35 are provided with a pin 40 and a pin 41 respectively where the second tension spring 42 is attached. As is shown in FIG. 1, the middle block 21 is provided with a radially outwardly projecting part 21A and second balls lie in a V groove formed at the bottom of the projected part 21A and on the circumference of the ring-shaped member 35. As is shown in FIG. 4, three of the second tension springs 42 and second balls 43 are arranged respectively on the circumference of the ring-shaped member 35 at the same intervals. On account of that, the power of the second tension spring which draws the stylus support 29 toward the ring-shaped member 35 is abutted by the second balls 43. Incidentally, the three point linkage which supports the stylus support 29 through the ring-shaped member 35 is defined by the second tension spring 42 and the second balls 43. As a result, the stylus support 29 is kept in the casing 30 through the second ball 43, the ring-shaped member 35 and the first spring 38.

Next, an operation of the above-described embodiment will hereunder be explained.

The touch signal probe is first installed in the touch signal probe installation shaft of the three-dimensional measuring machine and then the stylus 1 is caused to touch the object to be measured by a movement of this probe installation shaft in X Y, and Z directions against the object set on the mounting table. When the stylus 1 touches the object to be measured from the X-Y direction, the stylus installation shaft 2 is displaced in the X-Y direction on the basis of the first and second blade-like springs 8 and 10 and the displacement is detected by the X-Y sensors 25. Also, when the stylus 1 touches the object to be measured from the Z direction, since the first blade-like spring 8 and the second blade-like spring 10 bend vertically, the stylus installation shaft 2 is displaced upward, which is detected by the Z sensor 26. When the displacement of the stylus installation shaft 2 is detected by the sensors 25 and 26, a luminous device 44 turns on and the thus detected signal is outputted to the arithmetic control unit through the output code connected to the connector 45 and the size and the form of the object to be measured are measured according to the moving distance of the touch signal probe installation shaft till the stylus 1 touches the object to be measured.

When the touch signal probe installation shaft continues to move though the stylus 1 touches the object to be measured, since the big displacement of the stylus 1 and the stylus installation shaft 2 affects the stylus support 29 through the first and the second blade-like springs 8 and 10, the stylus support 29 is displaced so as to balance such big displacement in the X-Y or the Z direction against the casing 30 by the above-mentioned two of three point coordinate linkages.

In addition, till the stylus 1 touches the object to be measured, the vibration of the stylus 1 and the stylus installation shaft 2 generated during the movement of the touch signal probe and that of the stylus 1 and the stylus installation shaft 2 after the touch of the stylus 1 to the object to be measured are restrained by the damper mechanism 20 constructed with the above-explained annular slat 9 and the viscous liquid 19, by which the malfunction of the sensors 25 and 26 is prevented.

In each of the first and the second blade-like springs, the spring constant the Z direction is dozens of times as large as that in the X-Y direction. In the above-mentioned embodiment, since the first and the second blade-like springs 8 and 10 are parallel connected with the annular slat 9, therebetween, in the center of which there is the thick hub part 9A which is wide in the X-Y direction, the total spring constant of the blade-like springs 8 and 10 in the X-Y direction is the same as or almost the same as the spring constant in the Z direction. Therefore, when the stylus 1 touches the object to be measured in the X-Y direction and the Z direction and that is detected by the sensors 25 and 26, because the measuring force in the X-Y direction is equal to or almost equal to that in the Z direction, the difference in polarity of measuring force is eliminated.

Because the stylus 1 is installed in the bottom side of the stylus installation shaft 2 and the sensors 25 and 26 are provided in the upper side of the stylus installation shaft 2, and the first and the second blade-like springs 8 and 10 are installed in the center of the axial direction of the stylus installation shaft 2 including the length of the stylus 1, the distance between the end of the stylus 1 which touches the object to be measured and the blade-like springs 8 and 10 is the same as or almost the same as that between the blade-like springs 8 and 10 and the sensors 25 and 26. Therefore, by the touch of the stylus 1 to the object to be measured in the X-Y direction, when the stylus installation shaft 2 is displaced in the X-Y direction at the fulcrum of the blade-like springs 8 and 10, because the displacement quality of the upper end of the stylus installation shaft 2 and that of the lower end of the stylus 1 are the same or almost the same, the sensitivity of the sensors 25 can become high.

The above-mentioned damper mechanism 20 is defined by filling the viscous liquid 19 inside the space S between the two blade-like springs 8 and 10 which contains the annular slat 9. Thus, the blade-like springs 8 and 10 form the closure space S and a miniaturized damper mechanism in the center of the displacement of the stylus installation shaft 2. That encourages the whole touch signal probe to be miniaturized and the other parts to be set freely.

Because the sensors 25 and 26 are installed apart from the damper mechanism 20, instead of inside of the viscous liquid 19 in the damper mechanism 20, the sensitivity of sensors 25 and 26 is good.

In the above-described embodiment, the thick part 9A of the annular slat 9 is formed together with the body of the slat, but each can be united after forming them separately.

The stylus support 29, which is explained in the above-mentioned embodiment, is supported two of the three point linkages composed of the springs 38, 42, and the balls 39, 43, but these linkages can be omitted.

Moreover, the kind of the sensors 25 and 26 includes not only an inductance sensor but a sensor which can detect the displacement of the stylus installation shaft 2.

With regard to the present invention, since the center part of the slat which is a component of the damper mechanism is thick, and this thick part touches the two blade-like springs which from the center part of the displacement of the stylus installation shaft, the spring constant of the blade-like springs made up of two pieces is the same as or almost the same as in the X-Y direction and in the Z direction. Thus, the difference in polarity of measurement is eliminated.

In addition, two blade-like springs and the slat are positioned in the center of the stylus installation shaft including the length of the stylus, and since the distance between the end of the stylus and the blade-like springs and the slat is the same as or almost the same as that between the blade-like springs and slat and the sensors, when the stylus touches the object to be measured from the X-Y direction, the displacement quantity of the stylus installation shaft in the sensor part is the same as or almost the same as that of the stylus. Because of this, the sensitivity of detection by the sensors in the X-Y direction is improved.

What is claimed is:

1. A touch signal probe, comprising:
   a stylus installation shaft;
   a stylus mounted on said stylus installation shaft and being adapted to contact an object to be measured;
   sensors positioned to oppose said stylus installation shaft and to detect and signal a displacement thereof caused by a contact of said stylus with the object to be measured;
   two blade-like springs supported for orthogonal movement with said stylus installation shaft, said springs being installed to define a closed closure space therebetween along a longitudinal axis of said stylus installation shaft;
   a viscous liquid received in said closed closure space; and
   a slat of a damper housed in said closure space filled with viscous liquid and extending at a right angle to the longitudinal axis of said stylus installation shaft, said slat having a thick hub part at the center thereof through which said stylus installation shaft extends in a condition of contact with said two blade-like springs.

2. The touch signal probe according to claim 1, wherein said stylus is provided at one end of said stylus installation shaft, wherein said sensors are disposed at the other end of said stylus installation shaft, and wherein said two blade-like springs and slat are positioned adjacent a center of a length of said stylus installation shaft which length includes a length of said stylus.

3. The touch signal probe according to claim 2, wherein said sensors consists of four X-Y sensors which are arranged in the four horizontal directions of the X and Y axis directions to detect and signal a displacement of said stylus installation shaft in the X-Y directions and a Z sensor to detect and signal a displacement of said stylus installation shaft in a Z axis direction.

4. The touch signal probe according to claim 1, wherein a joined state of said two blade-like springs and said slat having the thick hub part defines a spring constant which is the same in the X-Y direction and in the Z direction.

5. The touch signal probe according to claim 1, wherein said stylus, stylus installation shaft, sensors, blade-like springs and the slat are lifted up by a first three point linkage consisting of first tension springs, first balls and a ring-shaped member, and conversely, stylus, stylus installation shaft, sensors, blade-like springs and the slat are drawn down by a second three point linkage consisting of second tension springs and second balls.

6. The touch signal probe according to claim 5, wherein horizontal arrangements of the first tension springs and first balls of the first three point linkage and the second tension springs and second balls of the second three point linkage are relatively spaced at the same intervals from each other.

* * * * *